United States Patent
Matsushita et al.

(10) Patent No.: US 12,097,571 B2
(45) Date of Patent: *Sep. 24, 2024

(54) DOUBLE-SIDE FRICTION STIR WELDING METHOD AND DOUBLE-SIDE FRICTION STIR WELDING DEVICE FOR METAL SHEETS OR METAL PLATES

(71) Applicant: JFE Steel Corporation, Tokyo (JP)

(72) Inventors: Muneo Matsushita, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,481

(22) Filed: May 17, 2023

(65) Prior Publication Data
US 2023/0286077 A1 Sep. 14, 2023

Related U.S. Application Data

(62) Division of application No. 16/635,016, filed as application No. PCT/JP2018/028516 on Jul. 31, 2018, now abandoned.

(30) Foreign Application Priority Data

Aug. 1, 2017 (JP) .................................. 2017-148785

(51) Int. Cl.
*B23K 20/00* (2006.01)
*B23K 20/12* (2006.01)

(52) U.S. Cl.
CPC ........ *B23K 20/1255* (2013.01); *B23K 20/126* (2013.01)

(58) Field of Classification Search
CPC .............. B23K 20/122; B23K 20/1255; B23K 20/126; B23K 20/1265; B23K 2101/18; B23K 37/0235; B23K 37/0408
See application file for complete search history.

(56) References Cited

U.S. PATENT DOCUMENTS 4,811,887 A 3/1989 King et al.
5,460,317 A 10/1995 Thomas et al.
(Continued)

FOREIGN PATENT DOCUMENTS

EP 2474382 A1 7/2012
JP 62183979 A 8/1987
(Continued)

OTHER PUBLICATIONS

Computer English translation JP4868685 (Year: 2024).*
(Continued)

*Primary Examiner* — Erin B Saad
(74) *Attorney, Agent, or Firm* — Buchanan Ingersoll & Rooney PC

(57) ABSTRACT

Provided is a double-side friction stir welding method of metal sheets or metal plates to each other, and a double-side friction stir device for performing the double-side friction stir welding. According to the present invention, a pair of rotating tools facing each other is respectively arranged on a top-surface side and a bottom-surface side of a butted portion or an overlapping portion, which comprises a joint portion of two metal sheets or two metal plates, the pair of rotating tools is moved in a welding direction while being rotated at the butted portion or the overlapping portion, and while the metal sheets or the metal plates are softened by frictional heat generated between the rotating tools and the metal sheets or the metal plates, softened parts are stirred by the rotating tools to produce a plastic flow to join the metal sheets or the metal plates to each other.

4 Claims, 3 Drawing Sheets

(56) References Cited

U.S. PATENT DOCUMENTS

| | | | |
|---|---|---|---|
| 9,010,613 | B1 | 4/2015 | Matlack et al. |
| 10,259,085 | B2 | 4/2019 | Sato |
| 10,512,985 | B2 | 12/2019 | Sato et al. |
| 11,446,757 | B2 * | 9/2022 | Matsushita .......... B23K 20/123 |
| 2002/0179673 | A1 | 12/2002 | Strombeck et al. |
| 2011/0084116 | A1 | 4/2011 | Ohashi et al. |
| 2016/0167161 | A1 | 6/2016 | Sato |
| 2017/0050263 | A1 | 2/2017 | Wu et al. |

FOREIGN PATENT DOCUMENTS

| | | | |
|---|---|---|---|
| JP | 07505090 | A | 6/1995 |
| JP | 3261433 | B2 | 3/2002 |
| JP | 4838385 | B2 | 12/2011 |
| JP | 4838388 | B2 | 12/2011 |

OTHER PUBLICATIONS

Extended European Search Report for European Application No. 18840952.8, dated Nov. 19, 2020, 9 pages.
International Search Report and Written Opinion for International Application No. PCT/JP2018/028516, dated Oct. 23, 2018, 6 pages.
Japanese Office Action for Japanese Application No. 2018-557952, dated Oct. 9, 2019, with Concise Statement of Relevance of Office Action, 6 pages.
Entire patent prosecution history of U.S. Appl. No. 16/635,016, filed Jan. 29, 2020, entitled, "Double-Side Friction Stir Welding Method and Double-Side Friction Stir Welding Device for Metal Sheets or Metal Plates."

* cited by examiner (1)

(2)

DOUBLE-SIDE FRICTION STIR WELDING METHOD AND DOUBLE-SIDE FRICTION STIR WELDING DEVICE FOR METAL SHEETS OR METAL PLATES

CROSS REFERENCE TO RELATED APPLICATIONS

This is a Divisional application of U.S. application Ser. No. 16/635,016, filed Jan. 29, 2020 which is the U.S. National Phase application of PCT/JP2018/028516, filed Jul. 31, 2018 which claims priority to Japanese Patent Application No. 2017-148785, filed Aug. 1, 2017, the disclosures of these applications being incorporated herein by reference in their entireties for all purposes.

FIELD OF THE INVENTION

The present invention relates to a double-side friction stir welding method of welding metal sheets or metal plates to each other, and to a double-side friction stir welding device for performing double-side friction stir welding. In the friction stir welding method, a pair of rotating tools facing each other is respectively disposed on a top-surface side and a bottom-surface side of a butted portion or an overlapping portion, which becomes a welded joint of the metal sheets or the metal plates; the pair of rotating tools is moved in a welding direction while being rotated at the butted portion or the overlapping portion; and while the metal sheets or the metal plates are softened by frictional heat generated between the rotating tools and the metal sheets or the metal plates, softened parts are stirred by the rotating tools. As a result, a plastic flow is caused to occur at the welded joint to join the metal sheets or the metal plates to each other.

Aspects of the present invention are directed to overcoming a problem that may occur when the friction stir welding method is applied to joining metal sheets or metal plates to each other or when the friction stir welding device is applied to joining metal sheets or metal plates to each other, that is, the problem that a localized improper plastic flow occurs in the welded joint due to differences in temperature and plastic flow occurring in a thickness direction of the metal sheets or the metal plates at the welded joint. Therefore, aspects of the present invention are advantageous in overcoming welding defects, ensures a sufficient strength (joint strength), and intends to improve welding workability, in particular, to increase welding speed.

In the description below, a butted portion (or an overlapping portion) where the metal sheets or the metal plates (such as steel sheets or steel plates) only butt against each other (or overlap each other) and are not joined to each other yet is called an "unwelded joint", whereas a portion where the metal sheets or the metal plates are integrated to each other by being joined to each other due to a plastic flow is called a "welded joint".

BACKGROUND OF THE INVENTION

As a friction welding method, Patent Literature 1 discloses a technology in which, while a pair of metal materials is softened by frictional heat generated between the metal materials by rotating one or both of the metal materials, softened parts are stirred to produce a plastic flow to join the metal materials to each other. However, in this technology, since the metal materials to be joined to each other are rotated, there is a limit to the shapes and dimensions of the metal materials.

On the other hand, Patent Literature 2 discloses a method of continuously joining metal sheets or metal plates to each other in a longitudinal direction by heat generated and a plastic flow between rotating tools, which are made of materials that are substantially harder than the materials of the metal sheets or the metal plates, by inserting the rotating tools into an unwelded joint of the metal sheets or the metal plates and by moving the rotating tools while being rotated. In this technology, the metal sheets or the metal plates in a fixed state are joined to each other by moving the rotating tools while being rotated. Therefore, this method is advantageous in that even substantially indefinitely elongated members in the welding direction can be continuously subjected to solid-state welding in a longitudinal direction thereof. In addition, since the solid-state welding uses a plastic flow of metals caused by frictional heat between the rotating tools and the metal sheets or the metal plates, the metal sheets or the metal plates can be joined to each other without melting the welded joint. Further, this method has many advantages such as deformation being small after the welding because the heating temperature is low, and defects being few and a metal filler being unnecessary because the welded joint is not melted.

As a welding method of welding low-melting-point metal sheets or metal plates, metal sheets or metal plates made of an aluminum alloy or a magnesium alloy being typical examples, the friction stir welding method is becoming widely used in the fields of, for example, airplanes, ships, railroad vehicles, and automobiles. This is because, although such low-melting-point metal sheets or metal plates do not easily allow a welded joint to have satisfactory characteristics in existing arc welding methods, when the friction stir welding method is applied, such low-melting-point metal sheets or low-melting-point metal plates allow productivity to be increased and allow a high-quality welded joint to be provided.

On the other hand, the application of the friction stir welding method to structural steel sheets or structural steel plates primarily used as material for structures, such as buildings, ships, heavy machines, pipelines, or automobiles, allows solidification cracking or hydrogen cracking, which are problems in existing melt welding, and structural changes in steel sheets or steel plates to be suppressed from occurring. Therefore, it is possible to expect an increase in joint performance. In addition, since by stirring a joining interface by the rotating tools, clean surfaces can be created and can be brought into contact with each other, the advantage that a previous preparation step, such as diffusion bonding, is not required can be expected. In this way, when the friction stir welding method is applied to structural steel sheets or structural steel plates, many advantages are expected. However, since problems related to joining workability, such as suppression of occurrence of defects at the time of welding and an increase in welding speed (that is, the moving speed of the rotating tools) still remain, the application of the friction stir welding method to structural steel sheets or structural steel plates is not as widespread as the application of the friction stir welding method to low-melting-point metal sheets or low-melting-point metal plates.

An example of the main causes of defects in the friction stir welding method described in Patent Literature 2 is differences in temperature and plastic flow occurring in a thickness direction of the metal sheets or the metal plates. When the metal sheets or the metal plates are to be joined to each other by pushing the rotating tool against one surface side of a joint portion of the metal sheets or the metal plates and by moving the rotating tool in the welding direction while being rotated, the surface side that is pushed by a shoulder part of the rotating tool is subjected to a large deformation at high temperatures due to a sufficient temperature increase and shear-stress load caused by rotating the shoulder part, as a result of which clean surfaces are created at a welding interface. In addition, by bringing the clean surfaces into contact each other at the welding interface, a sufficient plastic flow for attaining a metallurgical welded state is realized. On the other hand, the surface side opposite thereto is subjected to relatively lower temperatures and to a smaller shear-stress load, as a result of which a state in which a plastic flow sufficient for attaining a metallurgically welded state is not realized tends to occur.

When the technology of the friction stir welding method described in Patent Literature 2 is applied to structural steel sheets or structural steel plates, since the strength of the structural steel sheets or structural steel plates under high temperatures is high, in the case of low-heat input and high welding speed, there is a strong tendency that a state of a sufficient plastic flow described above cannot be realized. Therefore, it is difficult to increase the welding speed while suppressing defects at the time of welding from occurring.

Patent Literature 3, Patent Literature 4, and Patent Literature 5 disclose a double-side friction stir welding method. In the double-side friction stir welding method, shoulder parts of a pair of rotating tools facing each other is respectively pushed against a top-surface side and a bottom-surface side of a joint portion of metal sheets or metal plates, and two surfaces of the joint portion of the metal sheets or the metal plates are subjected to a large deformation at high temperatures due to a sufficient temperature increase and shear stress caused by rotating the shoulder parts. Therefore, it is possible to realize a plastic flow sufficient for realizing a homogeneously welded state with respect to the thickness direction of the metal sheets or the metal plates, and to increase the welding speed while suppressing defects at the time of welding from occurring. However, regarding the technologies described in Patent Literature 3, Patent Literature 4, and Patent Literature 5, when pushing the shoulder parts of the pair of rotating tools facing each other respectively against the top-surface side and the bottom-surface side of the joint portion of the metal sheets or the metal plates, a gap between the shoulder parts of the pair of rotating tools, which is important in realizing a temperature increase and shear stress sufficient for realizing the welded state, is not considered at all.

PATENT LITERATURE

PTL 1: Japanese Unexamined Patent Application Publication No. 62-183979
PTL 2: Japanese Unexamined Patent Application Publication (Translation of PCT Application) No. 7-505090
PTL 3: Japanese Patent No. 3261433
PTL 4: Japanese Patent No. 4838385
PTL 5: Japanese Patent No. 4838388

SUMMARY OF THE INVENTION

An object according to aspects of the present invention is to provide a friction stir welding method that overcomes the problems of the related art, and a friction stir welding device that is suitable for performing friction stir welding. That is, in accordance with aspects of the present invention, when performing double-side friction stir welding, shoulder parts of a pair of rotating tools facing each other is respectively pushed against a top-surface side and a bottom-surface side of a joint portion of metal sheets or metal plates, and two surfaces of the joint portion of the metal sheets or the metal plates are subjected to a large deformation at high temperatures due to a sufficient temperature increase and shear-stress caused by rotating the shoulder parts, so that it is possible to realize a plastic flow sufficient for realizing a homogeneously welded state with respect to a thickness direction of the metal sheets or the metal plates. As a result, it is possible to provide a technology that allows the welding speed to be increased while suppressing defects at the time of welding from occurring, a sufficient strength (a joining strength) to be ensured, and welding workability to be improved. Above all, an object according to aspects of the present invention is to provide a friction stir welding method in which a gap between shoulder parts of a pair of rotating tools facing each other, which is important in realizing a sufficient temperature increase and shear stress for attaining a welded state, is closely examined; and a friction stir welding device for realizing this.

In accordance with aspects of the present invention, "welded state" refers to a state in which crystal grains are continuously formed across a welded joint interface of the metal sheets or the metal plates and the interface of the metal sheets or the metal plates has microscopically disappeared. "Attaining a welded state" or "realizing a welded state" means that the aforementioned state is attained or the aforementioned state is realized.

The present inventors have assiduously conducted studies to overcome the above-described problems and, as a result, have gained the findings (a) to (d) mentioned below.

(a) In double-side friction stir welding, in terms of increasing the welding speed while suppressing defects at the time of welding from occurring, in order to homogeneously distribute with respect to a thickness direction of metal sheets or metal plates a temperature increase and shear stress sufficient for realizing a welded state, it is necessary to control a gap between the shoulder parts of a pair of rotating tools facing each other. In particular, when the pair of rotating tools is set at an inclination angle, it is effective to adjust the diameter of the shoulder part of each rotating tool and the inclination angle in addition to the thickness of each metal sheet or metal plate.

(b) When the pair of rotating tools facing each other is such that the rotation direction on a top-surface side and the rotation direction on a bottom-surface side are the same, the relative speed of a rotating tool with respect to the other rotating tool is zero. Therefore, in the gap between the shoulder parts of the respective rotating tools, plastic deformation is reduced as a plastic flow of the metal sheets or the metal plates approaches a homogeneous state, and heat cannot be generated by the plastic deformation of the metal sheets or the metal plates, as a result of which a good welded state cannot be attained. Consequently, in order to cause a temperature increase and shear stress sufficient for attaining a good welded state to be homogeneous with respect to the thickness direction of the metal sheets or the metal plates, the pair of rotating tools need to be such that the rotation direction on the top-surface side and the rotation direction on the bottom-surface side are opposite each other.

(c) In the pair of rotating tools facing each other, by controlling a gap between ends of pin parts, it becomes possible to realize a homogeneous temperature increase and shear stress with respect to the thickness direction of the metal sheets or the metal plates, and to increase the welding speed while suppressing defects at the time of welding from occurring. Further, by adjusting the thicknesses of the metal sheets or the metal plates and the diameters of the shoulder parts of the respective rotating tools, the effects are markedly exhibited.

(d) In the pair of rotating tools facing each other, by controlling the diameters of the shoulder parts, it is possible to realize a homogeneous temperature increase and shear stress with respect to the thickness direction of the metal sheets or the metal plates, and to increase the welding speed while suppressing defects at the time of welding from occurring. In particular, by limiting the diameters of the shoulder parts in relation to the thicknesses of the metal sheets or the metal plates, the effects can be markedly exhibited.

Aspects of the present invention are based on such findings.

That is, aspects of the present invention provide a double-side friction stir welding method in which a pair of rotating tools facing each other is respectively disposed on a top-surface side and a bottom-surface side of a butted portion or an overlapping portion, which comprises a joint portion of two metal sheets or two metal plates; the pair of rotating tools are moved in a welding direction while being rotated at the butted portion or the overlapping portion; and while the metal sheets or the metal plates are softened by frictional heat generated between the rotating tools and the metal sheets or the metal plates, softened parts are stirred by the rotating tools to produce a plastic flow to join the metal sheets or the metal plates to each other, wherein each of the pair of rotating tools includes a shoulder part and a pin part that is disposed at the shoulder part and that along with the shoulder part includes a common rotation axis, and at least the shoulder parts and the pin parts are made of materials that are harder than materials of the metal sheets or the metal plates, while the metal sheets or the metal plates are fixed by a gripping device, the pair of rotating tools is respectively pushed against a top surface and a bottom surface of each metal sheet or metal plate, and the rotating tools are moved in the welding direction while being rotated, and a gap G (mm) between the shoulder parts that is formed by providing a gap g (mm) between ends of the pin parts of the pair of respective rotating tools with respect to a thickness t (mm) of each metal sheet or metal plate for a case of butting or with respect to a total thickness t (mm) of the overlapped metal sheets or the overlapped metal plates for a case of overlapping satisfies $0.5 \times t \leq G \leq t$, and the pair of rotating tools is further rotated in opposite directions to perform the friction stir welding.

Aspects of the present invention also provide a double-side friction stir welding method in which a pair of rotating tools facing each other is respectively disposed on a top-surface side and a bottom-surface side of a butted portion or an overlapping portion, which comprises a joint portion of two metal sheets or two metal plates; the pair of rotating tools is moved in a welding direction while being rotated at the butted portion or the overlapping portion; and while the metal sheets or the metal plates are softened by frictional heat generated between the rotating tools and the metal sheets or the metal plates, softened parts are stirred by the rotating tools to produce a plastic flow to join the metal sheets or the metal plates to each other, wherein each of the pair of rotating tools includes a shoulder part and a pin part that is disposed at the shoulder part and that along with the shoulder part includes a common rotation axis, and at least the shoulder parts and the pin parts are made of materials that are harder than materials of the metal sheets or the metal plates, while the metal sheets or the metal plates are fixed by a gripping device, the pair of rotating tools is pushed against a top surface and a bottom surface of each metal sheet or metal plate, the rotating tools are moved in the welding direction while being rotated, and the rotation axes of the pair of respective rotating tools is inclined at an inclination angle $\alpha(°)$ on a preceding side with respect to the welding direction from a vertical direction with respect to the metal sheets or the metal plates, the inclination angle $\alpha$ satisfies $0 < \alpha \leq 3$, and a gap G (mm) between the shoulder parts that is formed by providing a gap g (mm) between ends of the pin parts of the pair of respective rotating tools with respect to a thickness t (mm) of each metal sheet or metal plate and a diameter D (mm) of the shoulder part of each rotating tool satisfies $(0.5 \times t) - (0.2 \times D \times \sin \alpha) \leq G \leq t - (0.2 \times D \times \sin \alpha)$, and the pair of rotating tools is further rotated in opposite directions to perform the friction stir welding.

In the double-side friction stir welding method according to aspects of the present invention, it is desirable that the diameter D (mm) of each shoulder part with respect to the thickness t (mm) of each metal sheet or metal plate satisfy $4 \times t \leq D \leq 20 \times t$, and that the gap g (mm) with respect to the thickness t (mm) of each metal sheet or metal plate for the case of butting or with respect to a total thickness t (mm) of the overlapped metal sheets or the overlapped metal plates for the case of overlapping and the diameter D (mm) of the shoulder part of each rotating tool satisfy $[0.1 - 0.09 \times \exp\{-0.011 \times (D/t)^2\}] \times t \leq g \leq [1 - 0.9 \times \exp\{-0.011 \times (D/t)^2\}] \times t$.

Further, aspects of the present invention provide a double-side friction stir welding device in which a pair of rotating tools facing each other is respectively disposed on a top-surface side and a bottom-surface side of a butted portion or an overlapping portion, which comprises a joint portion of two metal sheets or two metal plates; the pair of rotating tools is moved in a welding direction while being rotated at the butted portion or the overlapping portion; and while the metal sheets or the metal plates are softened by frictional heat generated between the rotating tools and the metal sheets or the metal plates, softened parts are stirred by the rotating tools to produce a plastic flow to join the metal sheets or the metal plates to each other, wherein each rotating tool includes a shoulder part and a pin part that is disposed at the shoulder part and that along with the shoulder part includes a common rotation axis, and at least the shoulder parts and the pin parts are made of materials that are harder than materials of the metal sheets or the metal plates, a gripping device that fixes the metal sheets or the metal plates while the pair of rotating tools are moved in the welding direction while being rotated is provided, a gap G (mm) between the shoulder parts that is formed by providing a gap g (mm) between ends of the pin parts of the pair of respective rotating tools with respect to a thickness t (mm) of each metal sheet or metal plate for a case of butting or with respect to a total thickness t (mm) of the overlapped metal sheets or the overlapped metal plates for a case of overlapping satisfies $0.5 \times t \le G \le t$, and a rotation driving device that further rotates the pair of rotating tools in opposite directions is provided.

Aspects of the present invention also provide a double-side friction stir welding device in which a pair of rotating tools facing each other is respectively disposed on a top-surface side and a bottom-surface side of a butted portion or an overlapping portion, which comprises a joint portion of two metal sheets or two metal plates; the pair of rotating tools is moved in a welding direction while being rotated at the butted portion or the overlapping portion; and while the metal sheets or the metal plates are softened by frictional heat generated between the rotating tools and the metal sheets or the metal plates, softened parts are stirred by the rotating tools to produce a plastic flow to join the metal sheets or the metal plates to each other, wherein each of the pair of rotating tools includes a shoulder part and a pin part that is disposed at the shoulder part and that along with the shoulder part includes a common rotation axis, and at least the shoulder parts and the pin parts are made of materials that are harder than materials of the metal sheets or the metal plates, a gripping device that fixes the metal sheets or the metal plates while the pair of rotating tools is moved in the welding direction while being rotated is provided, the rotation axes of the pair of respective rotating tools is inclined at an inclination angle α (°) on a preceding side with respect to the welding direction from a vertical direction with respect to the metal sheets or the metal plates, the inclination angle α satisfies $0 < \alpha \le 3$, and a gap G (mm) between the shoulder parts that is formed by providing a gap g (mm) between ends of the pin parts of the pair of respective rotating tools with respect to a thickness t (mm) of each metal sheet or metal plate for a case of butting or with respect to a total thickness t (mm) of the overlapped metal sheets or the overlapped metal plates for a case of overlapping and a diameter D (mm) of the shoulder part of each rotating tool satisfies $(0.5 \times t) - (0.2 \times D \times \sin \alpha) \le G \le t - (0.2 \times D \times \sin \alpha)$, and a rotation driving device that further rotates the pair of rotating tools in opposite directions is provided.

In the double-side friction stir welding device according to aspects of the present invention, it is desirable that the diameter D (mm) of each shoulder part with respect to the thickness t (mm) of each metal sheet or metal plate for the case of butting or with respect to the total thickness t (mm) of the overlapped metal sheets or the overlapped metal plates for the case of overlapping satisfy $4 \times t \le D \le 20 \times t$, and that the gap g (mm) with respect to the thickness t (mm) of each metal sheet or metal plate for the case of the butting or the total thickness t (mm) of the overlapped metal sheets or the overlapped metal plates for the case of overlapping and the diameter D (mm) of the shoulder part of each rotating tool satisfy $[0.1-0.09 \times \exp\{-0.011 \times (D/t)^2\}] \times t \le g \le [1-0.9 \times \exp\{-0.011 \times (D/t)^2\}] \times t$.

According to aspects of the present invention, in performing double-side friction stir welding, the shoulder parts of the pair of rotating tools facing each other is respectively pushed against the top surface and the bottom surface of a joint portion of the metal sheets or the metal plates, and the two surfaces of the joint portion of the metal sheets or the metal plates are subjected to a large deformation at high temperatures due to a sufficient temperature increase and shear stress caused by rotating the shoulder parts. Therefore, it is possible to accelerate a homogeneous plastic flow with respect to the thickness direction of the metal sheets or the metal plates, and to attain a good welded state. As a result, it is possible to increase the welding speed while suppressing defects at the time of welding from occurring, to ensure a sufficient strength, and to improve welding workability, so that the effects are industrially considerably exhibited.

DETAILED DESCRIPTION OF EMBODIMENTS OF THE INVENTION

In accordance with aspects of the present invention, double-side friction stir welding is performed by butting two metal sheets or metal plates against each other or by making the two metal sheets or metal plates overlap each other and by disposing a pair of rotating tools respectively on a top-surface side and a bottom-surface side of a butted portion or an overlapping portion.

A case in which double-side friction stir welding is performed on a butted portion is described in detail below with reference to FIGS. 1 and 2.

Figure 1:
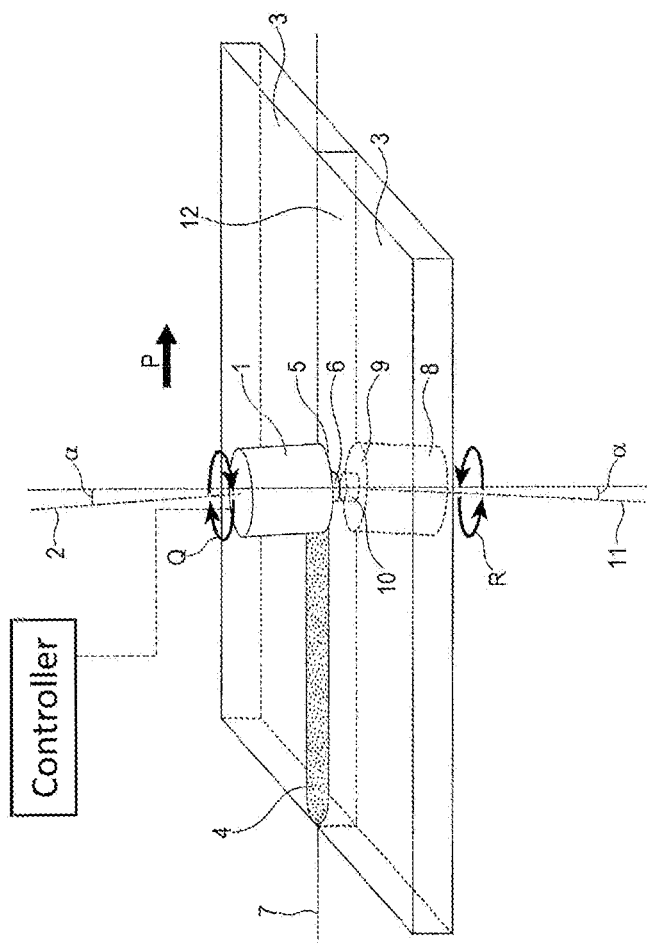
FIG. 1 is a schematic perspective view of an exemplary arrangement of rotating tools and metal sheets or metal plates in accordance with aspects of the present invention.

As shown in FIG. 1, a pair of rotating tools 1 and 8 is respectively disposed so as to face the top-surface side and the bottom-surface side of each of two metal sheets 3 or metal plates 3 that are butted against each other, the rotating tools 1 and 8 are inserted into an unwelded joint 12 from the top-surface side and the bottom-surface side, respectively, of each metal sheet 3 or metal plate 3, and the pair of rotating tools 1 and 8 is moved in a welding direction while being rotated. The arrow P in FIG. 1 indicates the advancing direction of the rotating tools 1 and 8 (that is, the welding direction), the arrow Q indicates the rotation direction of the rotating tool 1 that is disposed on the top-surface side, and the arrow R indicates the rotation direction of the rotating tool 8 that is disposed on the bottom-surface side.

While the metal sheets 3 or the metal plates 3 are softened by generating frictional heat by rotating the pair of rotating tools 1 and 8 facing each other, softened parts are stirred by the pair of rotating tools 1 and 8 to produce a plastic flow and to join the metal sheets 3 or the metal plates 3 to each other. A welded joint 4 that is obtained in this way is linearly formed in the advancing direction of the rotating tools 1 and 8. A straight line 7 (hereunder called "welding center line") extending from the unwelded joint 12 to the center of the width of the welded joint 4 in FIG. 1 matches a path of the rotating tools 1 and 8 that advance in the direction of arrow P (see FIG. 2(1)).

When the rotating tools 1 and 8 advance along the welding center line 7, the two metal sheets 3 or metal plates 3 are gripped by a gripping device (not shown) and are fixed at predetermined positions. As the gripping device, a device that is capable of preventing variations in the positions of the metal sheets 3 or the metal plates 3 as the rotating tools 1 and 8 advance may be used, so that the structure of the gripping device is not particularly limited to certain structures.

Figure 2:
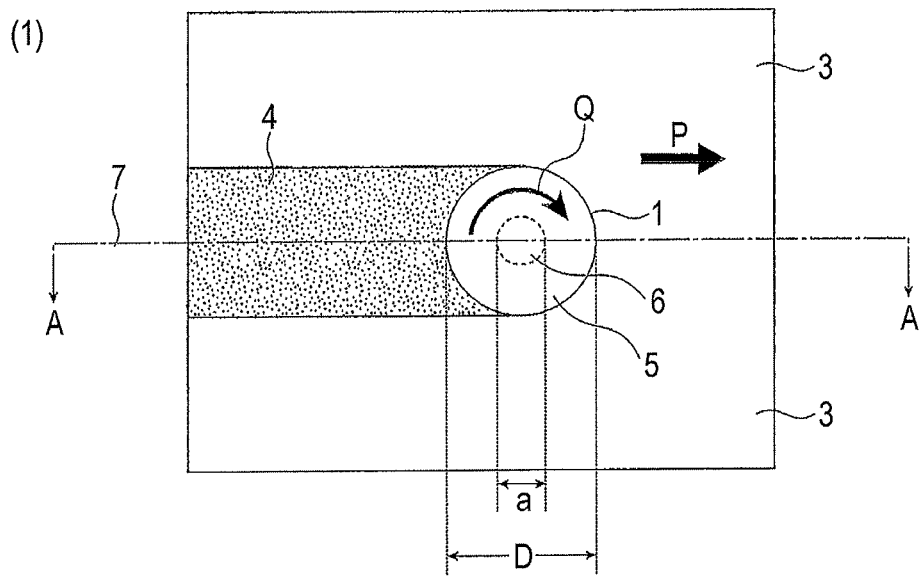
FIG. 2(1) is a plan view showing a part of the rotating tools and the metal sheets or the metal plates in FIG. 1, and FIG. 2(2) is a sectional view along arrow A-A shown in FIG. 2(1).
Figure 2:
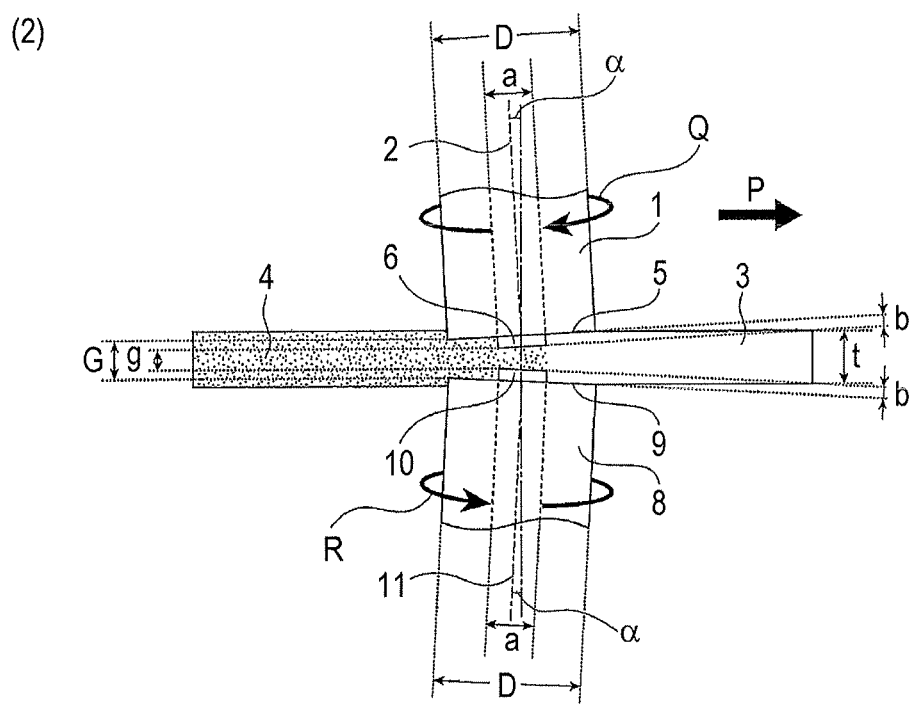

An end of the pin part 6 of the rotating tool 1 on the top-surface side and an end of the pin part 10 of the rotating tool 8 on the bottom-surface side are not in contact with each other and a gap g (mm) is provided therebetween as shown in FIG. 2(2). A gap G (mm) is formed between stepped portions 5 and 9 (hereunder called "shoulder parts"), the stepped portion 5 being formed due to a difference between a diameter D (mm) of the rotating tool 1 and a diameter a (mm) of the pin part 6 and the stepped portion 9 being formed due to a difference between a diameter D (mm) of the rotating tool 8 and a diameter a (mm) of the pin part 10.

Further, the rotating tool 8 on the bottom-surface side is rotated in a direction (that is, the direction of arrow R) opposite to the rotation direction (that is, the direction of arrow Q) of the rotating tool 1 on the top-surface side. For example, as shown in FIG. 2(1), in plan view as seen from the top-surface side of each metal sheet 3 or metal plate 3, when the rotating tool 1 is rotated clockwise, the rotating tool 8 is rotated counterclockwise. Although not shown, when the rotating tool 1 is rotated counterclockwise, the rotating tool 8 is rotated clockwise.

In this way, the gap g is provided between the end of the pin part 6 of the rotating tool 1 and the end of the pin part 10 of the rotating tool 8, the gap G is provided between the shoulder part 5 of the rotating tool 1 and the shoulder part 9 of the rotating tool 8, and the rotating tool 1 and the rotating tool 8 are rotated in opposite directions. Therefore, it is possible to subject both surfaces of each metal sheet 3 or metal plate 3 to a sufficient temperature increase and shear stress, to reduce differences between the temperatures and between the plastic flows occurring in a thickness direction of each metal sheet 3 or metal plate 3 at the welded joint 4, and to attain a homogeneous welded state. In addition, it is possible to advantageously overcome welding defects by overcoming plastic flow failures occurring locally inside the welded joint 4, to ensure a sufficient strength, and to improve welding workability, in particular, to increase welding speed.

The rotating tool 1 on the top-surface side includes the shoulder part 5 and the pin part 6 that is disposed at the shoulder part 5 and that includes along with the shoulder part 5 a common rotation axis 2. The rotating tool 8 on the bottom-surface side includes the shoulder part 9 and the pin part 10 that is disposed at the shoulder part 9 and that along with the shoulder part 9 includes a common rotation axis 11. At least the shoulder parts 5 and 9 and the pin parts 6 and 10 are made of materials that are harder than the materials of the metal sheets 3 or the metal plates 3.

By causing the rotation directions Q and R of the respective rotating tools 1 and 8 facing each other to be such that the rotation direction Q on the top-surface side is opposite to the rotation direction R on the bottom-surface side, it is possible to cancel rotation torques applied to the metal sheets 3 or the metal plates 3 by the rotations of the respective rotating tools 1 and 8. Compared to existing friction stir welding methods of welding metal sheets or metal plates by pushing the rotating tools from one-surface side, it is possible to simplify the configuration of a jig that retains the metal sheets 3 or the metal plates 3.

In contrast, if the rotation directions of the rotating tools 1 and 8 facing each other are such that the rotation direction of the rotating tool 1 on the top-surface side and the rotation direction of the rotating tool 8 on the bottom-surface side are the same, the relative speed of the rotating tool 8 on the bottom-surface side is zero with respect to the speed of the rotating tool 1 on the top-surface side. Therefore, as the state of the plastic flows of the metal sheets 3 or the metal plates 3 between the shoulder part 5 of the rotating tool 1 and the shoulder part 9 of the rotating tool 8 approaches a homogeneous state, plastic deformations are reduced and heat generated by the plastic deformations of the metal sheets 3 or the metal plates 3 can no longer be generated, as a result of which it becomes impossible to attain a good welded state.

Therefore, in order to make a temperature increase and a shear stress that are sufficient for attaining a good welded state homogeneous with respect to a thickness direction of a workpiece, the rotation directions Q and R of the respective rotating tools 1 and 8 facing each other are such that the rotation direction Q on the top-surface side is opposite to the rotation direction R on the bottom-surface side.

Further, in accordance with aspects of the present invention, adjusting the arrangement of the rotating tools as follows is effective in terms of prolonging the life of each rotating tool, suppressing welding defects from occurring, and increasing the welding speed.

First, inclination angle $\alpha$ (°) of each rotating tool on the top-surface side and the bottom-surface side is described.

By causing the rotation axis 2 of the rotating tool 1 and the rotation axis 11 of the rotating tool 8 to be inclined at the angle $\alpha$ (°) from a vertical direction with respect to the metal sheets 3 or the metal plates 3 and by causing the ends of the respective pin parts 6 and 10 to precede with respect to a welding direction P, the rotating tools 1 and 8 can be subjected to loads with respect to the rotating tools 1 and 8 as component forces that are compressed in the directions of the respective rotation axes 2 and 11. The pair of rotating tools 1 and 8 need to be made of materials that are harder than the materials of the metal sheets 3 or the metal plates 3. When the rotating tools 1 and 8 are made of materials that lack toughness, such as ceramic, subjecting the pin parts 6 and 10 to bending-direction forces causes localized stress to be concentrated and the pin parts 6 and 10 to break. Therefore, by causing the rotation axes 2 and 11 of the respective rotating tools 1 and 8 to be inclined at the angle $\alpha$ (hereunder referred as the "inclination angle"), the loads exerted upon the rotating tools 1 and 8 are applied as component forces that are compressed in the directions of the respective rotation axes 2 and 11, such that it is possible to reduce the bending-direction forces and to prevent the rotating tools 1 and 8 from becoming damaged.

When the inclination angle $\alpha$ is greater than 0°, the aforementioned effects are obtained. However, when the inclination angle $\alpha$ is greater than 3°, the front and bottom surfaces of the welded joint become concave-shaped and adversely affect the welding joint strength. Therefore, 3° is the upper limit. That is, it is desirable that the inclination angle be $0°<\alpha\leq3°$. It is more desirable that the inclination angle be $0.5°\leq\alpha\leq2.0°$.

Even if the inclination angle $\alpha$ is 0°, it is possible to attain a welded state.

Next, the gap G (mm) between the shoulder part of the rotating tool on the top-surface side and the shoulder part of the rotating tool on the bottom-surface side is described.

In double-side friction stir welding, in terms of increasing the welding speed while suppressing defects at the time of welding from occurring, it is necessary to strictly control the gap G between the shoulder parts 5 and 9 of the respective rotating tools 1 and 8 facing each other, the gap being important in making a temperature increase and a shear stress that are sufficient for attaining a welded state homogenous with respect to the thickness direction of the metal sheets 3 or the metal plates 3.

When the inclination angle α of the rotating tools 1 and 8 on the top-surface side and the bottom-surface side, respectively, is 0°, the gap G is limited to a range of 0.5×t or greater and t or less with respect to thickness t (mm) of the metal sheets 3 or the metal plates 3 in the case of butt-welding or with respect to total thickness t (mm) of the overlapped metal sheets 3 or metal plates 3 in the case of overlap-welding. As a result, the shoulder parts 5 and 9 of the respective rotating tools 1 and 8 facing each other respectively push the top-surface side and the bottom-surface side of each metal sheet 3 or metal plate 3 by a sufficient load, and heat generation and plastic flow are accelerated due to friction produced and plastic deformation in a shearing direction by the shoulder parts 5 and 9 of the respective rotating tools 1 and 8. Therefore, it is possible to accelerate a homogeneous plastic flow with respect to the thickness direction of the metal sheets 3 or the metal plates 3, and to attain a good welded state. When the gap G between the shoulder parts 5 and 9 of the respective rotating tools 1 and 8 is greater than t, the shoulder parts 5 and 9 of the respective rotating tools 1 and 8 can no longer respectively push the top-surface side and the bottom-surface side of each metal sheet 3 or metal plate 3 by a sufficient load, as a result of the aforementioned effects cannot be obtained. On the other hand, when the gap G between the shoulder parts 5 and 9 is less than 0.5×t, the front and bottom surfaces of the welded joint become concave-shaped and adversely affect the welding joint strength. Therefore, when the inclination angle α=0°, the gap G must be 0.5×t or greater and t or less.

Further, when the inclination angle α of the rotating tools 1 and 8 facing each other is 0°<α≤3°, in order to bring the shoulder parts 5 and 9 of the respective rotating tools 1 and 8 respectively into contact with the top surface and the bottom surface of each metal sheet 3 or metal plate 3 over a wide range, the gap G between the shoulder part 5 of the rotating tool 1 on the top-surface side and the shoulder part 9 of the rotating tool 8 on the bottom-surface side needs to be set small. Therefore, when the inclination angle α is provided, the gap G needs to be (0.5×t)−(0.2×D× sin α) or greater and t−(0.2×D× sin α) or less with respect to, in addition to the thickness t of each metal sheet 3 or metal plate 3 (in the case of butt-welding) or the total thickness t of the overlapped metal sheets or metal plates (in the case of overlap-welding), diameter D (mm) of the shoulder parts 5 and 9 of the respective rotating tools 1 and 8 and the inclination angle α (°).

When the gap G is less than (0.5×t)−(0.2×D× sin α), the front and bottom surfaces of the welded joint become concave-shaped and adversely affect the welding joint strength. When the gap G is greater than t−(0.2×D× sin α), the shoulder parts 5 and 9 of the respective rotating tools 1 and 8 cannot respectively push the top-surface side and the bottom-surface side of each metal sheet 3 or metal plate 3 by a sufficient load, and the aforementioned effects cannot be obtained. It is desirable that the gap G be (0.6×t)−(0.2×D× sin α)≤G≤(0.9×t)−(0.2×D× sin α).

That is, the gap G is as follows:

When α=0°, $0.5 \times t \leq G \leq t$,

When 0°<α≤3°, $(0.5 \times t)-(0.2 \times D \times \sin \alpha) \leq G \leq t-(0.2 \times D \times \sin \alpha)$.

Next, the gap g (mm) between the end of the pin part of the rotating tool on the top-surface side and the end of the pin part of the rotating tool on the bottom-surface side is described.

In order to obtain a temperature increase and a shear stress that are homogeneous with respect to the thickness direction of the metal sheets 3 or the metal plates 3, and increase the welding speed while suppressing defects at the time of welding from occurring, it is effective to control the gap g between the ends of the pin parts 6 and 10 of the respective rotating tools 1 and 8 facing each other. In particular, when ratio (D/t) between the diameter D of each of the shoulder parts 5 and 9 of a corresponding one of the rotating tools 1 and 8 and the thickness t of the metal sheets 3 or the metal plates 3 (in the case of butt-welding) or the total thickness t of the overlapped metal sheets or metal plates (in the case of overlap-welding) is small, it becomes difficult to produce a homogeneous plastic flow with respect to the thickness direction. Therefore, it is effective to limit the gap g between the end of the pin part 6 and the end of the pin part 10 to a value greater than or equal to $[0.1-0.09 \times \exp\{-0.011 \times (D/t)^2\}] \times t$ and less than or equal to $[1-0.9 \times \exp\{-0.011 \times (D/t)^2\}] \times t$.

When the gap g between the end of the pin part 6 and the end of the pin part 10 is less than $[0.1-0.09 \times \exp\{-0.011 \times (D/t)^2\}] \times t$, the ends of the pin parts 6 and 10 of the respective rotating tools 1 and 8 facing each other may be brought into contact with each other and may become damaged, which is not desirable. When the gap g between the end of the pin part 6 and the end of the pin part 10 is greater than $[1-0.9 \times \exp\{-0.011 \times (D/t)^2\}] \times t$, a homogenous plastic flow with respect to the thickness direction cannot be effectively realized. That is, it is desirable that the gap g be $[0.1-0.09 \times \exp\{-0.011 \times (D/t)^2\}] \times t \leq g \leq [1-0.9 \times \exp\{-0.011 \times (D/t)^2\}] \times t$. It is more desirable that the gap g be $[0.12-0.09 \times \exp\{-0.011 \times (D/t)^2\}] \times t \leq g \leq [0.9-0.9 \times \exp\{-0.011 \times (D/t)^2\}] \times t$.

Next, the diameter D (mm) of the shoulder parts of the rotating tools, respectively, on the top-surface side and the bottom-surface side are described.

In addition to controlling the gaps G and g that have been already described, strictly controlling the diameter D of the shoulder parts 5 and 9 of the respective rotating tools 1 and 8 facing each other is effective in terms of realizing a homogeneous temperature increase and shear stress with respect to the thickness direction of the metal sheets 3 or the metal plates 3 and increasing the welding speed while suppressing defects at the time of welding from occurring. In particular, by limiting the diameter D (mm) to 4×t or greater and 20×t or less with respect to the thickness t (mm) of the metal sheets 3 or the metal plates 3, the effects can be obtained.

When the diameter D (mm) is less than 4×t, a homogenous plastic flow with respect to the thickness direction of the metal sheets 3 or the metal plates 3 cannot be effectively obtained. On the other hand, when the diameter D (mm) is greater than 20×t, only a region where unwanted plastic flow occurs is widened, as a result of which an excessive load is applied to the device, which is not desirable. That is, the diameter D is 4×t D 20×t. The thickness t refers to the thickness t (mm) of each metal sheet 3 or metal plate 3 in the case of butt welding or the total thickness t (mm) of the overlapped metal sheets 3 or the overlapped metal plates 3 in the case of overlap-welding. It is more desirable that the diameter D be 5×t≤D≤18×t.

Length b of the pin part 6 of the rotating tool 1 on the top-surface side and the pin part 10 of the rotating tool 8 on the bottom-surface side is determined as appropriate in accordance with the inclination angle α, the gap G between the shoulder parts, the gap g between the ends of the pin parts, the diameter D of the shoulder parts, and the thickness t.

The welding conditions other than those described above are in accordance with ordinary methods. This makes it possible to set the number of rotations of the rotating tools 1 and 8 facing each other in the range of 100 to 5000 rotations/minute and to increase the welding speed to 1000 mm/min or greater.

The metal sheets 3 or metal plates 3 to which aspects of the present invention are applied are suitably applicable to general structural steels or carbon steel sheets or carbon steel plates, such as steel sheets or steel plates in correspondence with JIS G 3106 or JIS G 4051. The metal sheets 3 or metal plates 3 are also advantageously applicable to high-strength structural steel sheets or high-strength structural steel plates having a tensile strength of 800 MPa or greater. Even in this case, the welded joint can have a strength that is greater than or equal to 85% of the tensile strength of the steel sheets or steel plates, or greater than or equal to 90% of the tensile strength of the steel sheets or steel plates.

EXAMPLES

Figure 3:
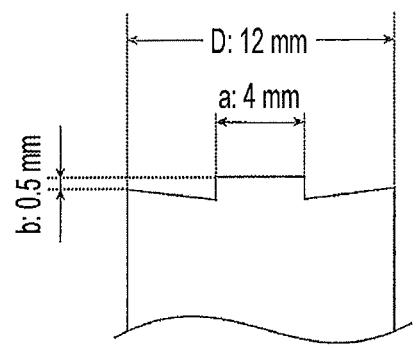
FIGS. 3(1) and 3(2) are each a sectional view showing the dimensions of cross sections of the rotating tools used in an embodiment.
Figure 3:
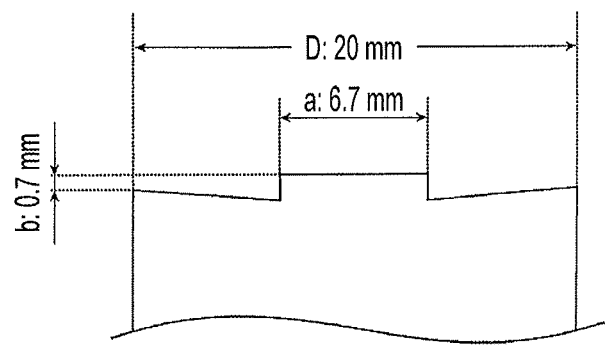

Using steel sheets or steel plates having the thickness, the chemical composition, and the tensile strength shown in Table 1, friction stir welding was performed. In the case of butt-welding, with joint-butt surfaces not being angled, that is, being in a so-called square-groove milled surface state, the joint-butt surfaces were pushed by rotating tools from both the top-surface side and the bottom-surface side of a butted portion of the steel sheets or steel plates, and were joined to each other. In the case of overlap-welding, two steel sheets or steel plates of the same type were caused to overlap each other and were pushed by the rotating tools from both the top-surface side and the bottom-surface side of an overlapping portion of the steel sheets or the steel plates, and were joined to each other. The welding conditions of the friction stir welding are shown in Table 2. When the facing rotating tools on the respective top-surface side and bottom-surface side were seen from the top-surface side, the welding was performed for the case where the rotation direction of the rotating tool on the top-surface side was clockwise and the rotation direction of the rotating tool on the bottom-surface side was counterclockwise, and for the case where the rotation direction of the rotating tool on the top-surface side and the rotation direction of the rotating tool on the bottom-surface side were both clockwise. Here, the rotating tools using as materials two types of tungsten carbide (WC) having cross-sectional shapes shown in FIGS. 3(1) and 3(2) were used.

TABLE 1

| | METAL-SHEET OR METAL-PLATE | CHEMICAL COMPOSITION (MASS %) | | | | | TENSILE STRENGTH |
|---|---|---|---|---|---|---|---|
| SYMBOL | THICKNESS t (mm) | C | Si | Mn | P | S | (MPa) |
| 1 | 1.6 | 0.3 | 0.21 | 0.69 | 0.012 | 0.003 | 1010 |
| 2 | 2.4 | 0.16 | 0.07 | 0.69 | 0.016 | 0.009 | 425 |
| 3 | 1.2 | 0.3 | 0.21 | 0.69 | 0.012 | 0.003 | 1012 |

TABLE 2

| | SPECIMEN STEEL SHEET OR STEEL PLATE | | | ROTATION DIRECTION OF ROTATING TOOL | |
|---|---|---|---|---|---|
| | SYMBOL | THICKNESS t (mm) | JOINT TYPE | TOP-SURFACE-SIDE TOOL | BOTTOM-SURFACE-SIDE TOOL |
| INVENTION EXAMPLE 1 | 1 | 1.6 | BUTT | CLOCKWISE | COUNTERCLOCKWISE |
| INVENTION EXAMPLE 2 | 1 | 1.6 | BUTT | CLOCKWISE | COUNTERCLOCKWISE |
| INVENTION EXAMPLE 3 | 1 | 1.6 | BUTT | CLOCKWISE | COUNTERCLOCKWISE |
| INVENTION EXAMPLE 4 | 1 | 1.6 | BUTT | CLOCKWISE | COUNTERCLOCKWISE |
| INVENTION EXAMPLE 5 | 1 | 1.6 | BUTT | CLOCKWISE | COUNTERCLOCKWISE |
| INVENTION EXAMPLE 6 | 1 | 1.6 | BUTT | CLOCKWISE | COUNTERCLOCKWISE |
| INVENTION EXAMPLE 7 | 2 | 2.4 | BUTT | CLOCKWISE | COUNTERCLOCKWISE |
| INVENTION EXAMPLE 8 | 2 | 2.4 | BUTT | CLOCKWISE | COUNTERCLOCKWISE |
| INVENTION EXAMPLE 9 | 2 | 2.4 | BUTT | CLOCKWISE | COUNTERCLOCKWISE |
| INVENTION EXAMPLE 10 | 2 | 2.4 | BUTT | CLOCKWISE | COUNTERCLOCKWISE |
| INVENTION EXAMPLE 11 | 3 | 1.2 | OVERLAP | CLOCKWISE | COUNTERCLOCKWISE |
| INVENTION EXAMPLE 12 | 3 | 1.2 | OVERLAP | CLOCKWISE | COUNTERCLOCKWISE |
| INVENTION EXAMPLE 13 | 3 | 1.2 | OVERLAP | CLOCKWISE | COUNTERCLOCKWISE |
| COMPARATIVE EXAMPLE 1 | 1 | 1.6 | BUTT | CLOCKWISE | COUNTERCLOCKWISE |
| COMPARATIVE EXAMPLE 2 | 1 | 1.6 | BUTT | CLOCKWISE | COUNTERCLOCKWISE |
| COMPARATIVE EXAMPLE 3 | 1 | 1.6 | BUTT | CLOCKWISE | COUNTERCLOCKWISE |

TABLE 2-continued

| | | | | | |
|---|---|---|---|---|---|
| COMPARATIVE EXAMPLE 4 | 1 | 1.6 | BUTT | CLOCKWISE | COUNTERCLOCKWISE |
| COMPARATIVE EXAMPLE 5 | 2 | 2.4 | BUTT | CLOCKWISE | COUNTERCLOCKWISE |
| COMPARATIVE EXAMPLE 6 | 2 | 2.4 | BUTT | CLOCKWISE | COUNTERCLOCKWISE |
| COMPARATIVE EXAMPLE 7 | 2 | 2.4 | BUTT | CLOCKWISE | COUNTERCLOCKWISE |
| COMPARATIVE EXAMPLE 8 | 3 | 1.2 | OVERLAP | CLOCKWISE | COUNTERCLOCKWISE |
| COMPARATIVE EXAMPLE 9 | 3 | 1.2 | OVERLAP | CLOCKWISE | COUNTERCLOCKWISE |
| COMPARATIVE EXAMPLE 10 | 1 | 1.6 | BUTT | CLOCKWISE | CLOCKWISE |
| COMPARATIVE EXAMPLE 11 | 2 | 1.2 | OVERLAP | CLOCKWISE | CLOCKWISE |

| | ROTATING TOOL DIMENSIONS | | | |
|---|---|---|---|---|
| | PIN PART DIAMETER a (mm) | PIN PART LENGTH b (mm) | SHOULDER PART DIAMETER D (mm) | INCLINATION ANGLE α (°) |
| INVENTION EXAMPLE 1 | 4 | 0.5 | 12 | 0.0 |
| INVENTION EXAMPLE 2 | 4 | 0.5 | 12 | 1.5 |
| INVENTION EXAMPLE 3 | 4 | 0.5 | 12 | 3.0 |
| INVENTION EXAMPLE 4 | 4 | 0.5 | 12 | 0.5 |
| INVENTION EXAMPLE 5 | 4 | 0.5 | 12 | 1.5 |
| INVENTION EXAMPLE 6 | 6.7 | 0.7 | 20 | 1.5 |
| INVENTION EXAMPLE 7 | 4 | 0.5 | 12 | 1.5 |
| INVENTION EXAMPLE 8 | 6.7 | 0.7 | 20 | 0.0 |
| INVENTION EXAMPLE 9 | 6.7 | 0.7 | 20 | 1.5 |
| INVENTION EXAMPLE 10 | 6.7 | 0.7 | 20 | 0.5 |
| INVENTION EXAMPLE 11 | 6.7 | 0.7 | 20 | 0.0 |
| INVENTION EXAMPLE 12 | 6.7 | 0.7 | 20 | 1.5 |
| INVENTION EXAMPLE 13 | 6.7 | 0.7 | 20 | 0.5 |
| COMPARATIVE EXAMPLE 1 | 4 | 0.5 | 12 | 3.0 |
| COMPARATIVE EXAMPLE 2 | 4 | 0.5 | 12 | 4.0 |
| COMPARATIVE EXAMPLE 3 | 4 | 0.5 | 12 | 3.0 |
| COMPARATIVE EXAMPLE 4 | 6.7 | 0.7 | 20 | 4.0 |
| COMPARATIVE EXAMPLE 5 | 4 | 0.5 | 12 | 1.5 |
| COMPARATIVE EXAMPLE 6 | 6.7 | 0.7 | 20 | 0.5 |
| COMPARATIVE EXAMPLE 7 | 6.7 | 0.7 | 20 | 4.0 |
| COMPARATIVE EXAMPLE 8 | 6.7 | 0.7 | 20 | 0.5 |
| COMPARATIVE EXAMPLE 9 | 6.7 | 0.7 | 20 | 4.0 |
| COMPARATIVE EXAMPLE 10 | 4 | 0.5 | 12 | 1.5 |
| COMPARATIVE EXAMPLE 11 | 6.7 | 0.7 | 20 | 1.5 |

| | ARRANGEMENT OF ROTATING TOOLS | | NUMBER OF ROTATIONS OF ROTATING TOOL | | |
|---|---|---|---|---|---|
| | GAP G BETWEEN SHOULDER PARTS (mm) | GAP g BETWEEN ENDS OF PIN PARTS (mm) | TOP SURFACE SIDE (ROTATIONS/ MINUTE) | BOTTOM SURFACE SIDE (ROTATIONS/ MINUTE) | WELDING SPEED (m/min) |
| INVENTION EXAMPLE 1 | 1.40 | 0.40 | 800 | 800 | 1 |
| INVENTION EXAMPLE 2 | 1.30 | 0.51 | 800 | 800 | 1 |
| INVENTION EXAMPLE 3 | 1.30 | 0.5 | 800 | 800 | 1 |
| INVENTION EXAMPLE 4 | 1.10 | 0.17 | 1600 | 1600 | 3 |
| INVENTION EXAMPLE 5 | 0.90 | 0.11 | 1600 | 1600 | 3 |
| INVENTION EXAMPLE 6 | 1.30 | 0.25 | 600 | 600 | 1 |
| INVENTION EXAMPLE 7 | 1.50 | 0.71 | 1600 | 1600 | 1 |
| INVENTION EXAMPLE 8 | 2.20 | 0.80 | 800 | 800 | 1 |
| INVENTION EXAMPLE 9 | 2.00 | 0.95 | 800 | 800 | 1 |
| INVENTION EXAMPLE 10 | 2.10 | 0.82 | 800 | 800 | 1 |

TABLE 2-continued

| | | | | | |
|---|---|---|---|---|---|
| INVENTION EXAMPLE 11 | 2.20 | 0.80 | 800 | 800 | 1 |
| INVENTION EXAMPLE 12 | 2.00 | 0.95 | 800 | 800 | 1 |
| INVENTION EXAMPLE 13 | 2.10 | 0.82 | 800 | 800 | 1 |
| COMPARATIVE EXAMPLE 1 | 1.50 | 0.92 | 800 | 800 | 1 |
| COMPARATIVE EXAMPLE 2 | 1.30 | 0.86 | 800 | 800 | 1 |
| COMPARATIVE EXAMPLE 3 | 0.65 | 0.07 | 800 | 800 | 1 |
| COMPARATIVE EXAMPLE 4 | 1.40 | 0.93 | 600 | 600 | 1 |
| COMPARATIVE EXAMPLE 5 | 2.00 | 1.21 | 1600 | 1600 | 1 |
| COMPARATIVE EXAMPLE 6 | 1.10 | 0.24 | 800 | 800 | 1 |
| COMPARATIVE EXAMPLE 7 | 1.20 | 1.32 | 800 | 800 | 1 |
| COMPARATIVE EXAMPLE 8 | 1.10 | 0.24 | 800 | 800 | 1 |
| COMPARATIVE EXAMPLE 9 | 1.20 | 1.32 | 800 | 800 | 1 |
| COMPARATIVE EXAMPLE 10 | 0.90 | 0.1 | 1600 | 1600 | 3 |
| COMPARATIVE EXAMPLE 11 | 2.00 | 0.95 | 800 | 800 | 1 |

| | RANGE OF GAP G (*1) | | RANGE OF GAP g (*2) | |
|---|---|---|---|---|
| | LOWER LIMIT (mm) | UPPER LIMIT (mm) | LOWER LIMIT (mm) | UPPER LIMIT (mm) |
| INVENTION EXAMPLE 1 | 0.80 | 1.60 | 0.08 | 0.82 |
| INVENTION EXAMPLE 2 | 0.74 | 1.54 | 0.08 | 0.82 |
| INVENTION EXAMPLE 3 | 0.67 | 1.47 | 0.08 | 0.82 |
| INVENTION EXAMPLE 4 | 0.78 | 1.58 | 0.08 | 0.82 |
| INVENTION EXAMPLE 5 | 0.74 | 1.54 | 0.08 | 0.82 |
| INVENTION EXAMPLE 6 | 0.70 | 1.50 | 0.13 | 1.34 |
| INVENTION EXAMPLE 7 | 1.14 | 2.34 | 0.08 | 0.76 |
| INVENTION EXAMPLE 8 | 1.20 | 2.40 | 0.14 | 1.39 |
| INVENTION EXAMPLE 9 | 1.10 | 2.30 | 0.14 | 1.39 |
| INVENTION EXAMPLE 10 | 1.17 | 2.37 | 0.14 | 1.39 |
| INVENTION EXAMPLE 11 | 1.20 | 2.40 | 0.14 | 1.39 |
| INVENTION EXAMPLE 12 | 1.10 | 2.30 | 0.14 | 1.39 |
| INVENTION EXAMPLE 13 | 1.17 | 2.37 | 0.14 | 1.39 |
| COMPARATIVE EXAMPLE 1 | 0.67 | 1.47 | 0.08 | 0.82 |
| COMPARATIVE EXAMPLE 2 | 0.63 | 1.43 | 0.08 | 0.82 |
| COMPARATIVE EXAMPLE 3 | 0.67 | 1.47 | 0.08 | 0.82 |
| COMPARATIVE EXAMPLE 4 | 0.52 | 1.32 | 0.13 | 1.34 |
| COMPARATIVE EXAMPLE 5 | 1.14 | 2.34 | 0.08 | 0.76 |
| COMPARATIVE EXAMPLE 6 | 1.17 | 2.37 | 0.14 | 1.39 |
| COMPARATIVE EXAMPLE 7 | 0.92 | 2.12 | 0.14 | 1.39 |
| COMPARATIVE EXAMPLE 8 | 1.17 | 2.37 | 0.14 | 1.39 |
| COMPARATIVE EXAMPLE 9 | 0.92 | 2.12 | 0.14 | 1.39 |
| COMPARATIVE EXAMPLE 10 | 0.74 | 1.54 | 0.08 | 0.82 |
| COMPARATIVE EXAMPLE 11 | 1.10 | 2.30 | 0.14 | 1.39 |

| | SUITABLE RANGE OF GAP G (*3) | | SUITABLE RANGE OF GAP g (*4) | |
|---|---|---|---|---|
| | LOWER LIMIT (mm) | UPPER LIMIT (mm) | LOWER LIMIT (mm) | UPPER LIMIT (mm) |
| INVENTION EXAMPLE 1 | 0.96 | 1.44 | 0.11 | 0.66 |
| INVENTION EXAMPLE 2 | 0.90 | 1.38 | 0.11 | 0.66 |
| INVENTION EXAMPLE 3 | 0.83 | 1.31 | 0.11 | 0.66 |
| INVENTION EXAMPLE 4 | 0.94 | 1.42 | 0.11 | 0.66 |
| INVENTION EXAMPLE 5 | 0.90 | 1.38 | 0.11 | 0.66 |

TABLE 2-continued

| | | | | |
|---|---|---|---|---|
| INVENTION EXAMPLE 6 | 0.86 | 1.34 | 0.17 | 1.18 |
| INVENTION EXAMPLE 7 | 1.38 | 2.10 | 0.12 | 0.52 |
| INVENTION EXAMPLE 8 | 1.44 | 2.16 | 0.19 | 1.15 |
| INVENTION EXAMPLE 9 | 1.34 | 2.06 | 0.19 | 1.15 |
| INVENTION EXAMPLE 10 | 1.41 | 2.13 | 0.19 | 1.15 |
| INVENTION EXAMPLE 11 | 1.44 | 2.16 | 0.19 | 1.15 |
| INVENTION EXAMPLE 12 | 1.34 | 2.06 | 0.19 | 1.15 |
| INVENTION EXAMPLE 13 | 1.41 | 2.13 | 0.19 | 1.15 |
| COMPARATIVE EXAMPLE 1 | 0.83 | 1.31 | 0.11 | 0.66 |
| COMPARATIVE EXAMPLE 2 | 0.79 | 1.27 | 0.11 | 0.66 |
| COMPARATIVE EXAMPLE 3 | 0.83 | 1.31 | 0.11 | 0.66 |
| COMPARATIVE EXAMPLE 4 | 0.68 | 1.16 | 0.17 | 1.18 |
| COMPARATIVE EXAMPLE 5 | 1.38 | 2.10 | 0.12 | 0.52 |
| COMPARATIVE EXAMPLE 6 | 1.41 | 2.13 | 0.19 | 1.15 |
| COMPARATIVE EXAMPLE 7 | 1.16 | 1.88 | 0.19 | 1.15 |
| COMPARATIVE EXAMPLE 8 | 1.41 | 2.13 | 0.19 | 1.15 |
| COMPARATIVE EXAMPLE 9 | 1.16 | 1.88 | 0.19 | 1.15 |
| COMPARATIVE EXAMPLE 10 | 0.90 | 1.38 | 0.11 | 0.66 |
| COMPARATIVE EXAMPLE 11 | 1.34 | 2.06 | 0.19 | 1.15 |

*1: $(0.5 \times t) - (0.2 \times D \times \sin \alpha) \leq G \leq t - (0.2 \times D \times \sin \alpha)$
*2: $[0.1 - 0.09 \times \exp\{-0.011 \times (D/t)^2\}] \times t \leq g \leq [1 - 0.9 \times \exp\{-0.011 \times (D/t)^2\}] \times t$
*3: $(0.6 \times t) - (0.2 \times D \times \sin \alpha) \leq G \leq (0.9 \times t) - (0.2 \times D \times \sin \alpha)$
*4: $[0.12 - 0.09 \times \exp\{-0.011 \times (D/t)^2\}] \times t \leq g \leq [0.9 - 0.9 \times \exp\{-0.011 \times (D/t)^2\}] \times t$ Table 3 shows whether or not surface defects existed in the observations of appearances of joints at the time of the welding, whether or not internal defects existed in the observations of cross sections of the joints, and tensile strengths when tension tests were performed by extracting tensile specimens having the dimensions of specimen No. 1 prescribed in JIS Z 3121 from the acquired welding joints.

Surface defects and internal defects were evaluated as follows.

<Evaluation of Surface Defects>

In the observations, parts in which the welding speeds of the acquired welding joints having the values shown in Table 2 were used. Whether or not surface defects existed was determined by visual inspection based on whether or not groove-shaped unwelded states due to a lack of plastic flow was observed or whether or not the welded joints had concave shapes due to the gap G between the shoulder parts of the joining tools being too narrow. When groove-shaped unwelded states or concave-shaped states of the welded joints were observed, a depth Dd (mm) was measured using a laser displacement meter for evaluating surface defects.

No: Neither of the surface defects described above were observed.

Good: Although at least one of the surface defects described above were observed, a ratio (Dd/t) between the depth Dd (mm) and the steel-sheet or steel-plate thickness t (mm) was 0.1 or less.

Yes: At least one of the surface defects described above were observed and the ratio (Dd/t) between the depth Dd (mm) and the steel-sheet or steel-plate thickness t (mm) was greater than 0.1, or groove-shaped unwelded states penetrated from the top surface to the bottom surface. When the groove-shaped unwelded states penetrated from the top surface to the bottom surface, evaluations were not performed for internal defects and joint strengths.

<Evaluations of Internal Defects>

In the observations, specimens were provided as follows. That is, parts in which the welding speeds of the acquired welding joints having the values shown in Table 2 were cut so as to provide a cross section in a location that was 20 mm from an end portion of a welding start side, a cross section in a location that was 20 mm from an end portion of a welding completion side, and a cross section in a location that was intermediate between both the end portions. Whether or not internal defects existed was evaluated by using an optical microscope (magnification: 10×) based on whether or not unwelded states produced in the interior of the welded joints due to a lack of plastic flow was observed.

No: Tunnel-shaped unwelded state was not observed at any of the three locations described above.

Good: An unwelded state inside a joint portion was observed in one of the three locations described above.

Yes: An unwelded state inside a joint portion was observed in two or more of the three locations described above.

TABLE 3

| | EXISTENCE OF SURFACE DEFECTS | EXISTENCE OF INTERNAL DEFECTS | TENSILE STRENGTH (MPa) |
|---|---|---|---|
| INVENTION EXAMPLE 1 | NO | NO | 1000 |
| INVENTION EXAMPLE 2 | NO | NO | 1003 |

TABLE 3-continued

| | EXISTENCE OF SURFACE DEFECTS | EXISTENCE OF INTERNAL DEFECTS | TENSILE STRENGTH (MPa) |
|---|---|---|---|
| INVENTION EXAMPLE 3 | NO | NO | 998 |
| INVENTION EXAMPLE 4 | NO | NO | 1007 |
| INVENTION EXAMPLE 5 | NO | NO | 1005 |
| INVENTION EXAMPLE 6 | NO | NO | 1002 |
| INVENTION EXAMPLE 7 | NO | NO | 405 |
| INVENTION EXAMPLE 8 | NO | NO | 417 |
| INVENTION EXAMPLE 9 | NO | NO | 420 |
| INVENTION EXAMPLE 10 | NO | NO | 420 |
| INVENTION EXAMPLE 11 | NO | NO | 997 |
| INVENTION EXAMPLE 12 | NO | NO | 1005 |
| INVENTION EXAMPLE 13 | NO | NO | 1003 |
| COMPARATIVE EXAMPLE 1 | YES (UNWELDED JOINT) | YES | 468 |
| COMPARATIVE EXAMPLE 2 | YES (CONCAVE SHAPE) | YES | 513 |
| COMPARATIVE EXAMPLE 3 | YES (CONCAVE SHAPE) | NO | 631 |
| COMPARATIVE EXAMPLE 4 | YES (UNWELDED JOINT) | NO | 577 |
| COMPARATIVE EXAMPLE 5 | GOOD | YES | 225 |
| COMPARATIVE EXAMPLE 6 | YES (CONCAVE SHAPE) | NO | 263 |
| COMPARATIVE EXAMPLE 7 | GOOD | YES | 241 |
| COMPARATIVE EXAMPLE 8 | YES (UNWELDED JOINT) | NO | 649 |
| COMPARATIVE EXAMPLE 9 | GOOD | YES | 565 |
| COMPARATIVE EXAMPLE 10 | YES (EXISTED WITH PENETRATION) | — | — |
| COMPARATIVE EXAMPLE 11 | YES (EXISTED WITH PENETRATION) | — | — |

As shown in Table 3, in the invention examples 1 to 10 for butt-welding and the invention examples 11 to 13 for overlap-welding, even if the welding speed was increased to 1 m/min or greater, surface defects were not observed in the observations of the appearances of the joints, and internal defects were not observed even in the observations of the cross sections of the joints, as a result of which it was confirmed that sound welded states were realized. Further, the joint strengths were 95% or greater than the tensile strengths of the steel sheets or the steel plates, which were the base materials. "Sound welded states" means that the surface-defect evaluation results and the internal-defect evaluations results were either "good" or "no".

On the other hand, in the comparative examples 1 to 7 for butt-welding and the comparative examples 8 and 9 for overlap-welding, surface defects were observed in the observations of the appearances of the joints and/or internal defects were observed in the observations of the cross sections of the joints, as a result of which sound welded states were not realized. In the comparative examples 10 and 11, since the surface-defect evaluations were "existed with penetration", welding failures occurred, as a result of which internal-defect evaluations and joint-strength evaluations were not performed.

Further, the joint strengths were 70% or less of the tensile strengths of the steel sheets or the steel plates, which were the base materials.

REFERENCE SIGNS LIST

1 rotating tool on top-surface side
2 rotation axis of rotating tool on top-surface side
3 metal sheet or metal plate
4 welded joint
5 shoulder part of rotating tool on top-surface side
6 pin part of rotating tool on top-surface side
7 weld center line
8 rotating tool on bottom-surface side
9 shoulder part of rotating tool on bottom-surface side
10 pin part of rotating tool on bottom-surface side
11 rotation axis of rotating tool on bottom-surface side
12 unwelded joint

The invention claimed is:

1. A double-side friction stir welding method in which a pair of rotating tools facing each other is respectively disposed on a top-surface side and a bottom-surface side of a butted portion or an overlapping portion, which comprises a joint portion of two metal sheets or two metal plates; the pair of rotating tools are moved in a welding direction while being rotated at the butted portion or the overlapping portion; and while the metal sheets or the metal plates are softened by frictional heat generated between the rotating tools and the metal sheets or the metal plates, softened parts are stirred by the rotating tools to produce a plastic flow to join the metal sheets or the metal plates to each other, wherein each of the pair of rotating tools includes a shoulder part and a pin part that is disposed at the shoulder part and that along with the shoulder part includes a common rotation axis, and at least the shoulder parts and the pin parts are made of materials that are harder than materials of the metal sheets or the metal plates, while the metal sheets or the metal plates are fixed by a gripping device, the pair of rotating tools is respectively pushed against a top surface and a bottom surface of each metal sheet or metal plate, and the rotating tools are moved in the welding direction while being rotated, an inclination angle $\alpha(°)$ of the rotation axes of the pair of respective rotating tools inclined on a preceding side with respect to the welding direction from a vertical direction satisfies $$0 < \alpha \leq 3, \text{ and}$$

a gap G (mm) between the shoulder parts that is formed by providing a gap g (mm) between ends of the pin parts of the pair of respective rotating tools with respect to a thickness t (mm) of each metal sheet or metal plate or a total thickness t (mm) of the overlapped metal sheets or the overlapped metal plates and the gap G (mm) between the shoulder parts of the rotating tools satisfies $$(((0.9+(0.2 \times 12 \times \sin 1.5°))/1.6) \times t) - (0.2 \times D \times \sin \alpha) \leq G \leq ((2.20/2.4) \times t) - (0.2 \times D \times \sin \alpha), \text{ and}$$

the pair of rotating tools is further rotated in opposite directions to perform the friction stir welding.

2. The double-side friction stir welding method according to claim 1, wherein the diameter D (mm) of each shoulder part with respect to the thickness t (mm) of each metal sheet or metal plate or the total thickness t (mm) of the overlapped metal sheets or the overlapped metal plates satisfies $$4 \times t \leq D \leq 20 \times t.$$

3. The double-side friction stir welding method according to claim 1, wherein the gap g (mm) with respect to the thickness t (mm) of each metal sheet or metal plate or the total thickness t (mm) of the overlapped metal sheets or the overlapped metal plates and the diameter D (mm) of the shoulder part of each rotating tool satisfies $$[0.1-0.09 \times \exp\{-0.011 \times (D/t)^2\}] \times t \leq g \leq [1-0.9 \times \exp\{-0.011 \times (D/t)^2\}] \times t.$$

4. The double-side friction stir welding method according to claim 2, wherein the gap g (mm) with respect to the thickness t (mm) of each metal sheet or metal plate or the total thickness t (mm) of the overlapped metal sheets or the overlapped metal plates and the diameter D (mm) of the shoulder part of each rotating tool satisfies $$[0.1-0.09 \times \exp\{-0.011 \times (D/t)^2\}] \times t \leq g \leq [1-0.9 \times \exp\{-0.011 \times (D/t)^2\}] \times t.$$

* * * * *

UNITED STATES PATENT AND TRADEMARK OFFICE
CERTIFICATE OF CORRECTION

| | | |
|---|---|---|
| PATENT NO. | : 12,097,571 B2 | |
| APPLICATION NO. | : 18/198481 | |
| DATED | : September 24, 2024 | |
| INVENTOR(S) | : Muneo Matsushita and Rinsei Ikeda | |

It is certified that error appears in the above-identified patent and that said Letters Patent is hereby corrected as shown below:

In the Claims

Column 22, in Claim 1, Line 52 delete "α(°)" and insert -- α (°) --.

Column 22, in Claim 1, Line 56 after "0<α≤3," delete "and".

Column 22, in Claim 1, Line 66 delete "(((0.9+" and insert -- (((0.90+ --.

Signed and Sealed this
Third Day of December, 2024

Katherine Kelly Vidal
*Director of the United States Patent and Trademark Office*